United States Patent [19]
Ogawa et al.

[11] Patent Number: 5,394,081
[45] Date of Patent: Feb. 28, 1995

[54] ROTARY PULSE GENERATOR

[75] Inventors: Akira Ogawa; Takahiro Kawakami, both of Omiya, Japan

[73] Assignee: Kansei Corporation, Omiya, Japan

[21] Appl. No.: 820,129

[22] Filed: Jan. 14, 1992

[51] Int. Cl.$^6$ ............ G01P 3/48; G01P 3/54; G01B 7/14

[52] U.S. Cl. ............ 324/174; 324/207.16; 324/207.2; 324/207.25

[58] Field of Search .......... 324/174, 207.2, 207.25, 324/173, 207.16; 310/156

[56] References Cited

U.S. PATENT DOCUMENTS

| | | | |
|---|---|---|---|
| 4,321,495 | 3/1982 | Kennedy | 324/174 |
| 4,611,168 | 9/1986 | Kudelski et al. | 324/174 |
| 4,646,042 | 2/1987 | Eshelman | 324/174 |

FOREIGN PATENT DOCUMENTS

| | | |
|---|---|---|
| 2200326 | 7/1972 | Germany. |
| 2196435 | 4/1988 | United Kingdom. |

Primary Examiner—Walter E. Snow
Attorney, Agent, or Firm—Foley & Lardner

[57] ABSTRACT

A rotary pulse generator includes a housing having a longitudinally extending bore formed therein; a rotation shaft extending in and along the bore of the housing; a pinion gear rotatably held by one end of the housing, the pinion gear being connected at a center portion thereof to one end of the rotation shaft so that the pinion gear and the rotation shaft rotate together about an axis of the rotation shaft; a cylindrical supporter disposed on the other end of the rotation shaft to rotate therewith about the axis of the rotation shaft; a bearing sleeve disposed between the wall of the bore and the cylindrical supporter so that the cylindrical supporter is smoothly rotated within the bearing sleeve; an annular magnet unit securely disposed on the cylindrical supporter to rotate therewith about the axis of the rotation shaft; and a magnetic detecting device stationarily held by the housing and located near the annular magnet unit to produce, upon rotation of the magnet unit, an information signal which represents the rotation speed of the rotation shaft. The rotation shaft extends in the bore of the housing without contacting a wall defined by the bore.

17 Claims, 6 Drawing Sheets

ROTARY PULSE GENERATOR

BACKGROUND OF THE INVENTION

1. Field of the Invention

The present invention relates in general to speed sensors. Particularly, the present invention relates to speed sensors used for measuring the travel speed of a motor vehicle. More specifically, the present invention is concerned with rotation speed sensors of a type which uses a magnetic detecting means.

2. Description of the Prior Art

In order to clarify the task of the present invention, one conventional rotation speed sensor of the above-mentioned type will be described with reference to FIG. 4 of the accompanying drawings, which is used for measuring the travel speed of a motor vehicle.

In FIG. 4, there is shown the conventional sensor which is generally designated by numeral 100. Denoted by numeral 102 is a pinion gear which is meshed with a gear (not shown) mounted on a drive shaft of an automotive transmission. The pinion gear 102 is fixed to one end of a rotation shaft 104 which is rotatably held in a plastic housing 106. The rotation shaft 104 has at the other end an annular supporter 108 on which an annular magnet unit 110 is concentrically mounted. The magnet unit 110 consists of a plurality of magnet elements which are arranged about the supporter 108 in such a manner that N-pole and S-pole appear alternately. Near one side of the annular magnet unit 110, there is placed a Hall-effect sensor element 112. Wires extend from the Hall-effect sensor element 112 to an electronic processing circuit which is printed on a print board 114. Denoted by numeral 116 is a socket member which has connector pins 118 connected through wires, (not shown) to terminal ends of the electronic processing circuit on the print board 114. A spring washer 119 is compressed between the annular supporter 108 and the housing 106 to bias the annular magnet unit 110 toward the Hall-effect sensor element 112.

However, due to its inherent construction, the above-mentioned conventional rotation speed sensor 100 has the following drawbacks.

First, because the smooth and stable rotation of the rotation shaft 104 depends chiefly on the physical intimacy between the shaft 104 and the housing 106, it is necessary to finish both the rotation shaft 104 and the housing 106 (viz., bore for the shaft 104) accurately with a highly skilled machining technique. In fact, in this conventional sensor 100, the rotation shaft 104 tends to receive a complex radial load from the wall of the bore of the housing 106.

Second, for increasing the wear and abrasion resistance of the rotation shaft 104, it is necessary to harden the outer surface of the same by using a surface hardening technique.

Third, because the rotation shaft 104 is designed to hold the pinion gear 102 and the magnet unit supporter 108, a milling process at "a" and a knurling process at "b" are necessary after machining the shaft 104.

These matters, however, bring about an increase in production cost and a troublesome production process.

SUMMARY OF THE INVENTION

It is therefore an object of the present invention to provide a rotation speed sensor which is free of the above-mentioned drawbacks.

According to the present invention, there is provided a rotation speed sensor, which comprises a housing having a longitudinally extending bore formed therein; a rotation shaft extending in and along the bore of the housing without contacting a wall defined by the bore; a pinion gear rotatably held by one end of the housing, the pinion gear being connected at a center portion thereof to one end of the rotation shaft, so that the pinion gear and the rotation shaft rotate together about an axis of the rotation shaft; a cylindrical supporter disposed on the other end of the rotation shaft to rotate therewith about the axis of the rotation shaft; a bearing sleeve disposed between the wall of the bore and the cylindrical supporter, so that the cylindrical supporter is smoothly rotated within the bearing sleeve; an annular magnet unit securely disposed on the cylindrical supporter to rotate therewith about the axis of the rotation shaft; and a magnetic detecting means stationarily held by the housing and located near the annular magnet unit to produce, upon rotation of the magnet unit, an information signal which represents the rotation speed of the magnet unit.

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

Figure 1:
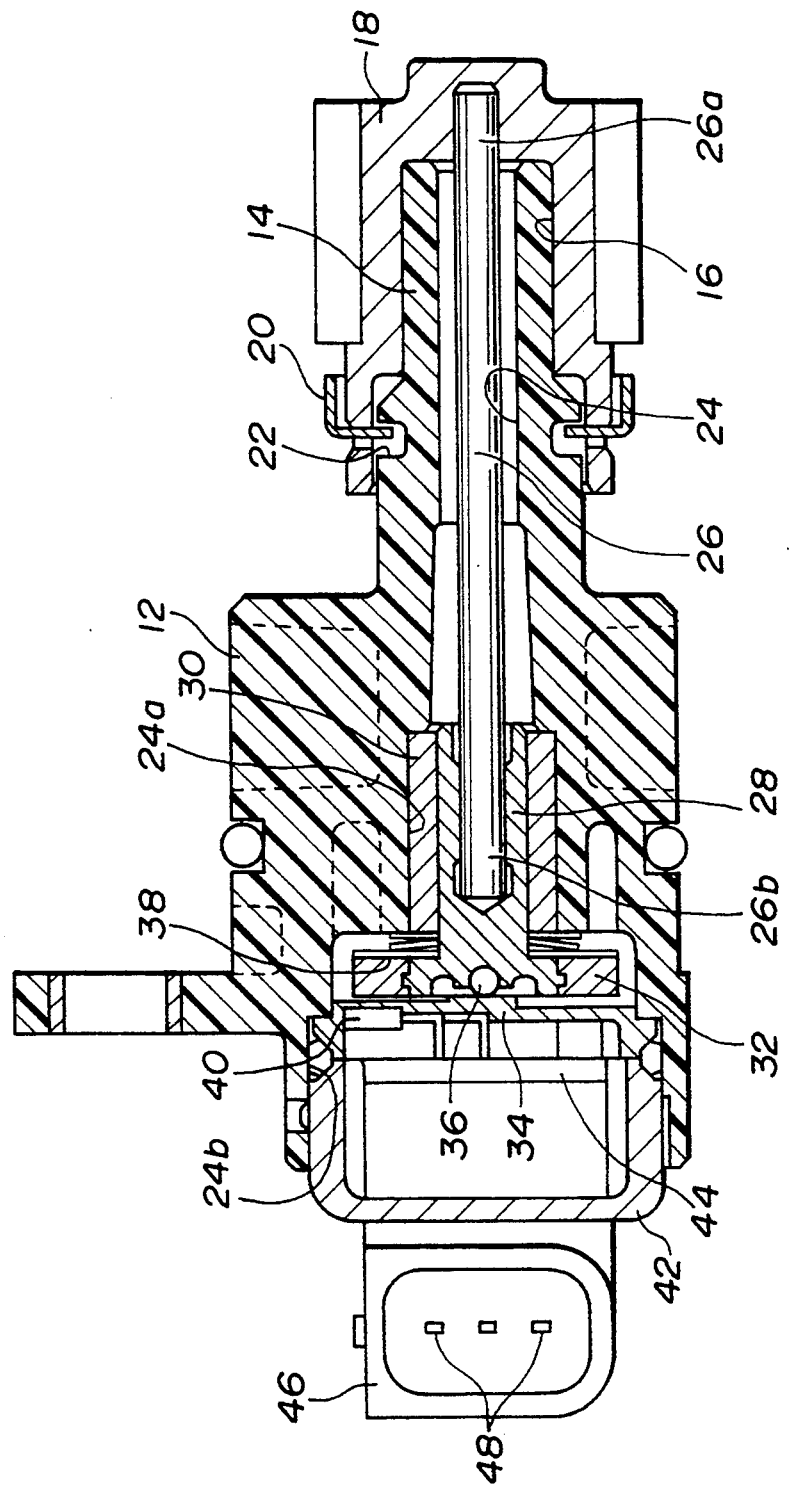
FIG. 1 is a sectional view of a rotation speed sensor which is a first embodiment of the present invention.

Referring to FIG. 1, there is shown a rotation speed sensor 10A which is a first embodiment of the present invention.

In the drawing, denoted by numeral 12 is a plastic housing which has a cylindrical end portion 14. The cylindrical end portion 14 is concentrically received in a cylindrical center bore 16 of a pinion gear 18 so that the pinion gear 18 can rotate about the cylindrical end portion 14. The pinion gear 18 is adapted to mesh with a gear (not shown) driven by an automotive transmission. The pinion gear 18 is provided with a stopper ring 20 which has an inwardly bent end slidably engaged with an annular groove 22 formed about the housing 12. With this stopper ring 20, undesired disconnection of the pinion gear 18 from the cylindrical end portion 14 is suppressed. The housing 12 is formed with a longitudinally extending bore 24 through which a rotation shaft 26 extends.

It is to be noted that the rotation shaft 26 has no portion which contacts the wall of the bore 24.

The rotation shaft 26 is a square bar, which has an outer end portion 26a intimately but axially movably received in a square blind bore formed in a center thicker portion of the pinion gear 18. The rotation shaft 26 has further an inner end portion 26b intimately but axially movably received in a square blind bore formed in a cylindrical supporter 28. It is thus to be noted that the rotation shaft 26, the pinion gear 18 and the cylindrical supporter 28 can rotate together like a unit.

The cylindrical supporter 28 has a smaller diameter cylindrical portion which is rotatably received in a bearing sleeve 30 fitted in a larger diameter portion 24a of the bore 24. Preferably, the bearing sleeve 30 is constructed of an oil-less bearing metal or the like. The cylindrical supporter 28 has further a larger diameter annular portion on which an annular magnet unit 32 is securely disposed. Similar to the magnet unit 110 of the afore-mentioned conventional speed sensor 100, the magnet unit 32 consists of a plurality of magnet elements which are alternately arranged about the annular ridge portion of the supporter 28.

A circular wall member 34 is fitted in the largest diameter portion 24b of the bore 24 of the housing 12 in a manner to face the annular magnet unit 32. A bearing ball 36 is partially and rotatably received in a spherical center recess of the cylindrical supporter 28, which is in contact with a center portion of the circular wall member 34.

A washer spring 38 is compressed between the larger diameter annular ridge portion of the cylindrical supporter 28 and a bottom part of the largest diameter portion of the bore 24, so that the cylindrical supporter 28 and thus the annular magnet unit 32 are biased toward the wall member 34, that is, leftward in FIG. 1. With the presence of the bearing ball 36, there is defined a small clearance between the wall member 34 and the annular magnet unit 32. A Hall-effect sensor element 40 is mounted to the wall member 34 near the annular magnet unit 32. A cap 42 is detachably fixed to the largest diameter bore portion 24b of the housing 12 in a manner to conceal the circular wall member 34. Wires (no numerals) extend from the Hall-effect sensor element 40 to an electronic processing circuit which is printed on an print board 44 stationarily installed in the largest bore portion 24b of the housing 12.

A socket member 46 is installed on the housing 12, which has connector pins 48 connected through wires (not shown) to terminal ends of the electronic processing circuit on the print board 44.

When in operation the rotation shaft 26 is rotated about its axis due to rotation of the drive shaft of the associated transmission, the annular magnet unit 32 is forced to rotate near the Hall-effect sensor element 40. Thus, the Hall-effect sensor element 40 produces information signals representative of the speed at which the magnet unit 32 rotates. By analyzing the information signals from the sensor element 40, the electronic processing circuit on the print board 44 derives the speed at which the associated motor vehicle runs.

In the following, advantages of the rotation speed sensor 10A of the invention will be described.

First, because the rotation shaft 26 has no portion which contacts with the wall of the longitudinally extending bore 24 of the housing 12, a complex radial load is never applied to the rotation shaft 26 from the housing 12. This means that in producing the rotation shaft 26, there is no need of using a highly skilled machining technique. Thus, cost reduction is available.

Second, because the rotation shaft 26 is spaced from the wall of the bore 24 of the housing 12, there is no need for hardening the outer surface of the shaft 26. Such hardening is needed in the afore-mentioned conventional rotation speed sensor 100.

Third, the expensive and troublesome milling and knurling processes are not necessary, which are needed in the afore-mentioned conventional one speed sensor.

Figure 2:
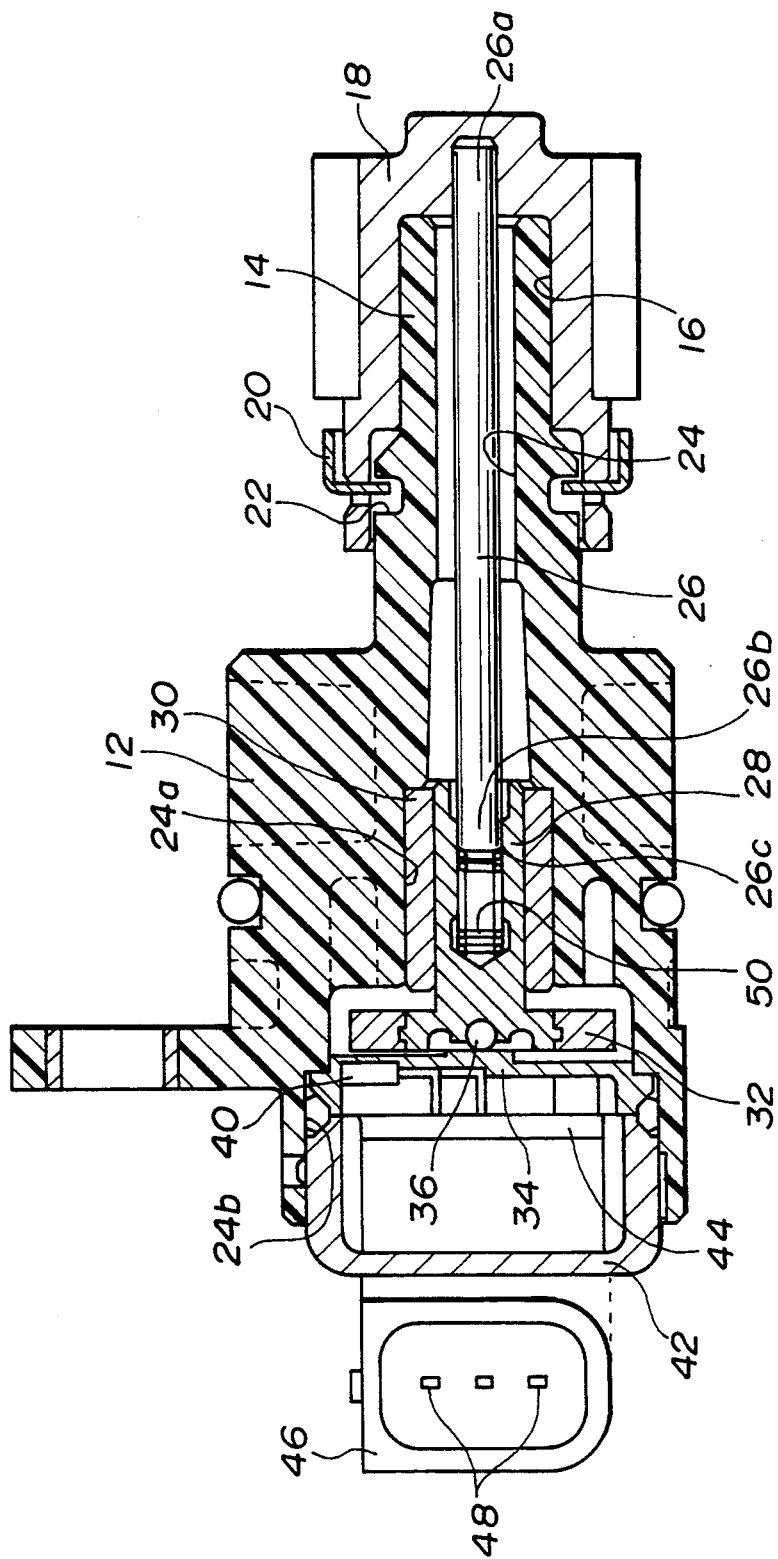
FIG. 2 is a view similar to FIG. 1, but showing a second embodiment of the present invention.

Referring to FIG. 2, there is shown a rotation speed sensor 10B which is a second embodiment of the present invention.

Because the sensor 10B is very similar in construction to the sensor 10A of the first embodiment, only parts which are different from those of the sensor 10A will be described in the following.

In place of the spring washer 38 employed in the first embodiment 10A, a coil spring 50 is used in the second embodiment 10B, which is operatively disposed in the square blind bore of the cylindrical supporter 28. That is, as is seen from FIG. 2, the coil spring 50 is disposed about a thin terminal end of the inner end portion 26b of the rotation shaft 26 and compressed between the bottom of the square blind bore of the cylindrical supporter 28 and a shoulder portion 26c defined at the root of the thin terminal end of the shaft 26. With the presence of the compressed coil spring 50, the cylindrical supporter 28 is biased toward the wall member 34, as in the case of the first embodiment 10A.

Because the spring washer 38 is not used in this embodiment 10B, durability of the supporter 28 is much improved as compared with that of the first embodiment 10A.

Figure 3:
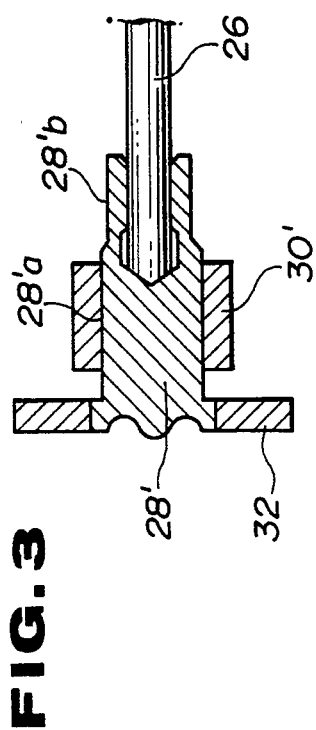
FIG. 3 is a sectional view of a cylindrical supporter which may be used in the rotation speed sensors of the first and second embodiments of the present invention.
Figure 4:
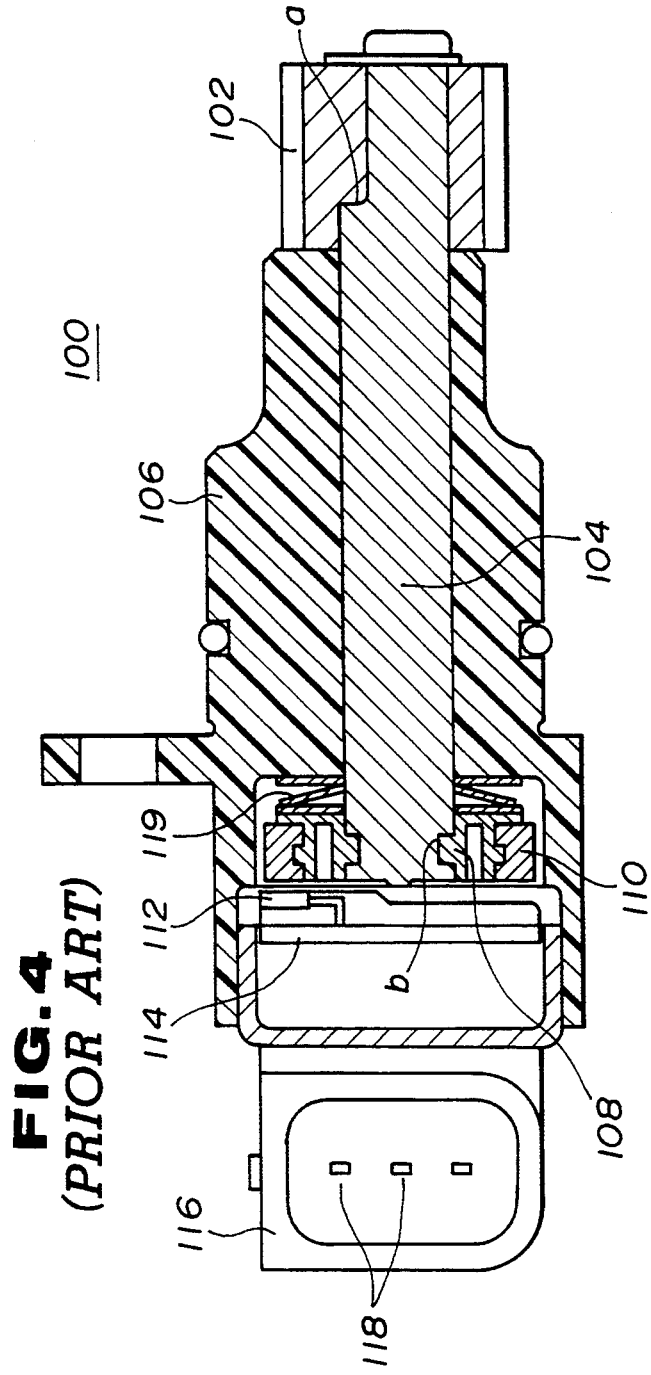
FIG. 4 is a view similar to FIG. 1, but showing a conventional rotation speed sensor.

Referring to FIG. 3, there is shown a modification 28' of the cylindrical supporter 28, which may be used in the first and second embodiments 10A and 10B.

The modified supporter 28' has a sleeve portion 28'b which coaxially extends from the smaller diameter cylindrical portion 28'a toward the rotation shaft 26. Connection of the shaft 26 with the supporter 28' is made by pressing or caulking the sleeve portion 28'b. In this modification, it is necessary to reduce the axial length of the bearing sleeve 30' to such a degree that the caulked sleeve portion 28'b is disengaged from the bearing sleeve 30'. This is for suppressing an undesired contact of the caulked sleeve portion 28'b with the sleeve 30'.

Figure 5:
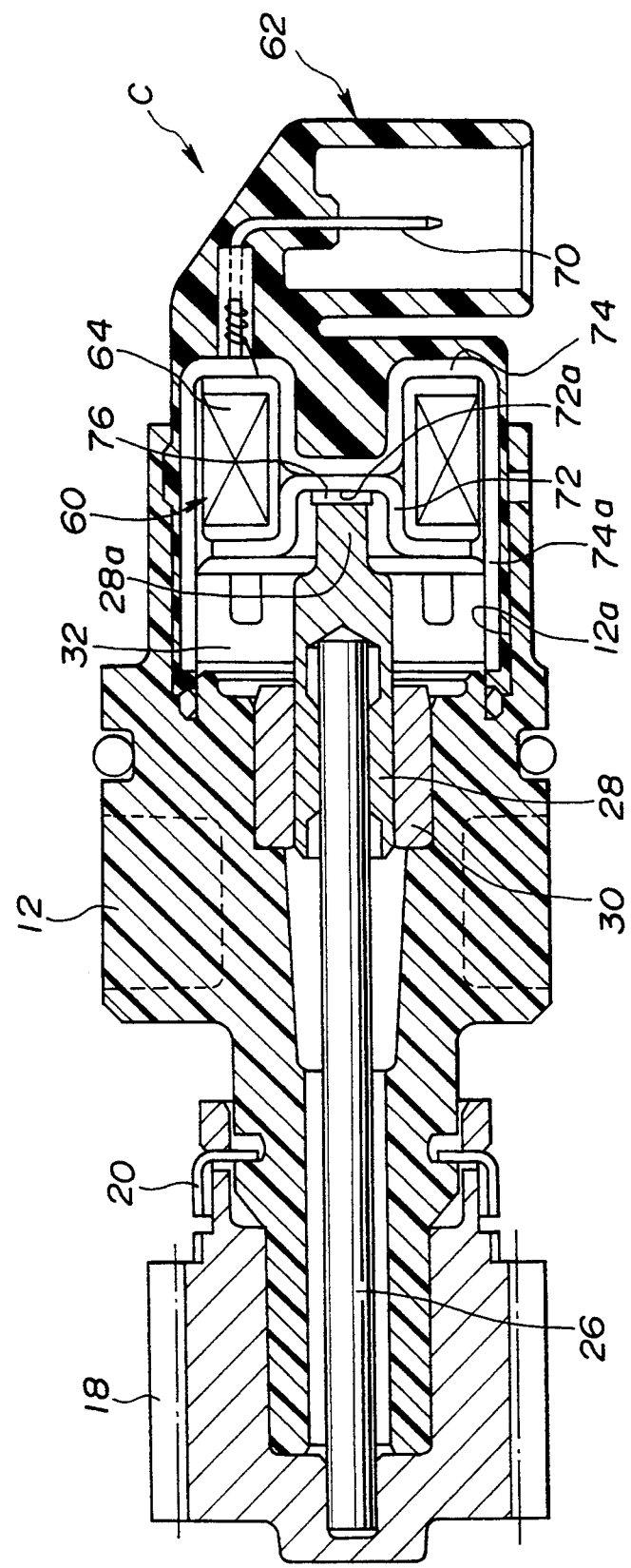
FIG. 5 is a sectional view of a rotation speed sensor which is a third embodiment of the present invention.

Referring to FIG. 5, there is shown a rotation speed sensor 10C, which is a third embodiment of the present invention.

As will become apparent as the description proceeds, in the sensor 10C of this third embodiment, a coil unit 60 is used in place of the Hall-effect sensor element 40 which is used in the afore-mentioned first and second embodiments 10A and 10B.

The coil unit 60 is installed in a molded plastic block C which is tightly put in a cylindrical recess 12a formed in a rear portion of the plastic housing 12. The molded block C has further an integral socket portion 62 in addition to the coil unit 60, as will become apparent hereinafter.

In the third embodiment 10C, the housing 12, the rotation shaft 26, the pinion gear 18, the stopper ring 20, the cylindrical supporter 28, the bearing sleeve 30 and the annular magnet unit 32 are arranged in substantially the same manner as those in the first and second embodiments 10A and 10B, and thus detailed explanation of these parts will be omitted from the following description.

Although not shown in the drawing, suitable biasing means is employed for biasing the cylindrical supporter 28 rightward in FIG. 5 for the same reasons as explained in the first and second embodiments 10A and 10B. Of course, the connection of the rotation shaft 26 with the pinion gear 18 and the cylindrical supporter 28 is, made so as to permit the axial movement therebetween.

For the reason which will be described hereinafter, the cylindrical supporter 28 is formed with an axially extending thinner shaft portion 28a.

Figure 6:
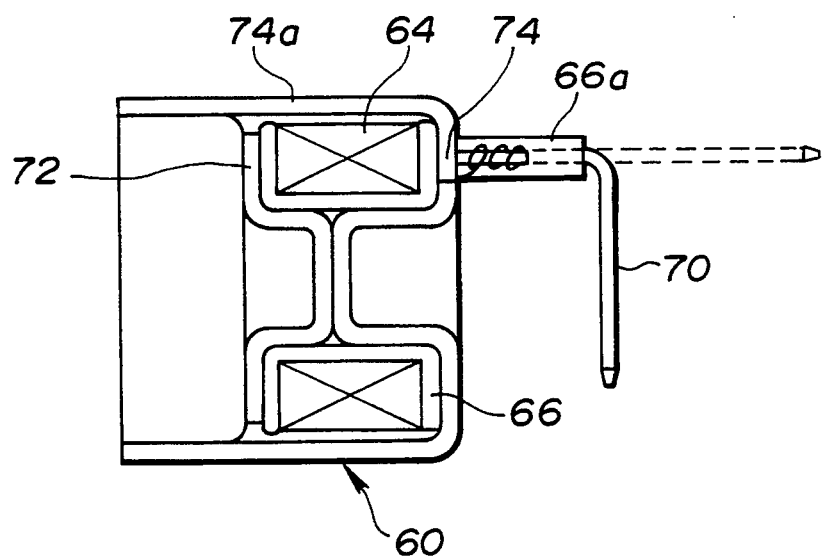
FIG. 6 is a side view of an essential device employed in the third embodiment.
Figure 7:
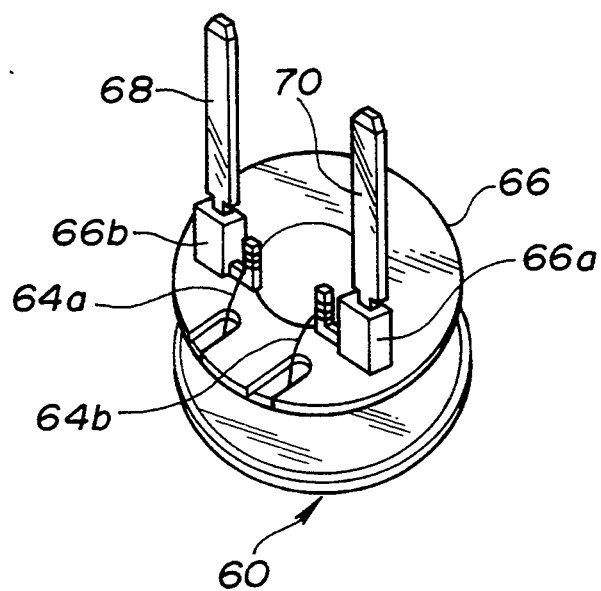
FIG. 7 is a perspective view of the essential device of FIG. 6.
Figure 8:
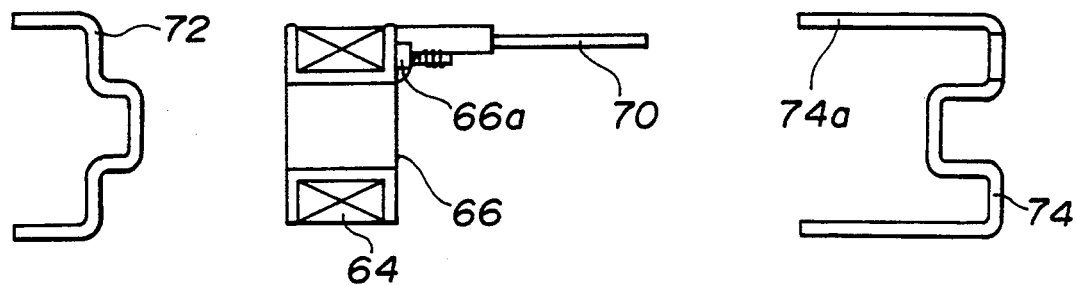
FIG. 8 is an exploded view of the essential device of FIG. 6.

As is seen from FIGS. 6, 7 and 8, the coil unit 60 installed in the molded block C comprises a coil 64 which is wound on a bobbin 66. As is shown in FIG. 7, the bobbin 66 is formed at one side with two supporting projections 66a and 66b by which two connector pins 68 and 70 are held. Both ends 64a and 64b of the coil 64 are respectively connected to branches of the connector pins 68 and 70. As is seen from FIGS. 6 and 8, first and second yoke plates 72 and 74 are combined to define thereabout an annular groove in which the bobbin 66 is concentrically disposed. The second yoke plate 74 has a cylindrical outer wall 74a which extends forward beyond the first yoke plate 72.

The molding of the block C is made as follows.

First, the coil unit 60 is constructed and assembled in the above-mentioned manner (see FIG. 7). Then, as is seen from FIG. 6, the connector pins 68 and 70 are bent at generally right angles, and the coil unit 60 is set in a mold assembly which is designed to produce a socket portion (62) on the block C. A fused plastic material is then poured into the mold assembly and cured to produce the molded block C which has the socket portion 62 integrally formed thereon. Leading ends of the connector pins 68 and 70 are exposed to a blind bore defined by the socket portion 62, as is understood from FIG. 5.

The molded block C is applied at its outer surface with a suitable adhesive and inserted into the cylindrical recess 12a of the housing 12. Upon proper insertion of the block C, the afore-mentioned thinner shaft portion 28a of the cylindrical supporter 28 is protruded into a center recess 72a of the first yoke plate 72 (see FIG. 5). A bearing member 76 is put between the terminal end of the thinner shaft portion 28a and the bottom of the center recess 72a. With this, the rotation speed sensor 10C of the third embodiment is finally assembled. As shown, the coil unit 60 is so arranged that the center axis of the coil 64 is consistent with the axis of the rotation shaft 26.

When in operation the rotation shaft 26 is rotated due to rotation of the drive shaft of the associated automotive transmission, and the annular magnet unit 32 is forced to rotate near the coil unit 60. Thus, the coil 64 generates an induced electromotive force whose intensity varies in accordance with the speed of the rotation shaft 26. Thus, by analyzing the intensity with the aid of an electronic processing unit, the speed of the rotation shaft 26, and thus, the speed of the associated motor vehicle is derived.

Since the coil unit 60 and the socket portion 62 are installed in and on the single molded block C, assembly of the entire construction of the sensor 10C is facilitated. Furthermore, because the coil unit 60, the connector pins 68 and 70 and the junction portions therebetween are substantially enclosed by the block C, the water resistance of those electric parts is improved.

Figure 9:
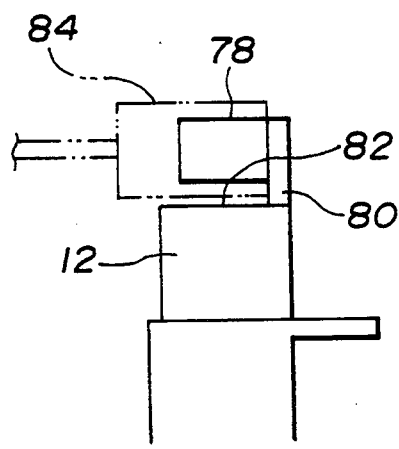
FIG. 9 is a schematic and partial view of a rotation speed sensor which is a fourth embodiment of the present invention, the sensor being formed with an integral socket portion.

Referring to FIG. 9, there is schematically shown a rotation speed sensor 10D, which is a fourth embodiment of the present invention.

Designated by numeral 12 is the plastic housing of the sensor 10D. The housing 12 is integrally formed at an axial end thereof with a rectangular socket portion 78. The socket portion 78 has therein a blind bore which extends in a direction perpendicular to the longitudinal axis of the housing 12. The socket portion 78 has connector pins (not shown) exposed to the blind bore thereof. Designated by numeral 80 is a support portion by which the socket portion 78 is held. Although not shown, a suitable wiring is installed in the support portion, through which the connector pins are connected to an electric speed detecting means installed in the housing 12. Denoted by numeral 82 is a clearance defined between the housing proper 12 and the socket portion 78, which is sized to receive the wall of a plug member 84. With this arrangement, compact construction of the rotation speed sensor 10D is achieved.

Figure 10:
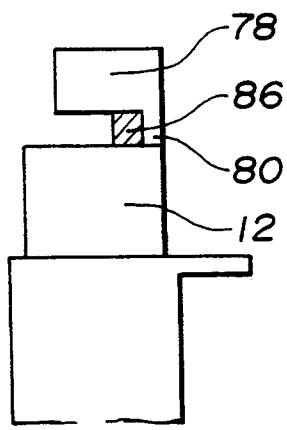
FIG. 10 is a view similar to FIG. 9, but showing a modified socket portion also usable in the fourth embodiment.
Figure 11:
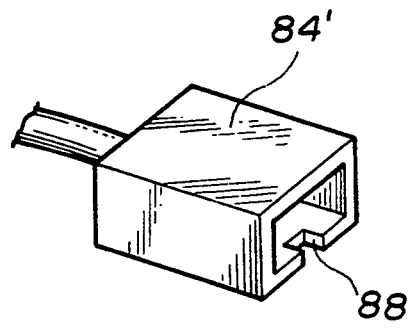
FIG. 11 is a perspective view of a plug member which is adapted to connect to the modified socket portion of FIG. 10.

If desired, as is shown in FIG. 10, a reinforcing rib 86 may be provided on the support portion 80 in order to reinforce the support portion 80. In this case, the plug member 84' (see FIG. 11) is formed with a recess 88 for receiving the rib 86.

What is claimed is:
1. A rotary pulse generator comprising:
 a housing having a longitudinally extending bore formed therethrough;
 a rotation shaft extending in and along the bore of said housing, said rotation shaft not contacting a wall of said bore, said shaft having first and second ends;
 a pinion gear rotatably held by one end of said housing and connected to said first end of said rotation shaft to rotate therewith;
 a cylindrical supporter rotatably disposed in said bore, said cylindrical supporter having therein a blind bore for receiving said second end of said rotation shaft such that said cylindrical supporter and said rotation shaft rotate in unison and are relatively axially displaceable;
 a bearing sleeve operatively disposed between the wall of said bore and said cylindrical supporter;
 a wall member fitted in said bore in a manner to face an axial end of said cylindrical supporter;
 a single bearing member interposed between said axial end and said wall member, said single bearing member being rotatably held by a center portion of said axial end and contacting said wall member in a point-contact manner;
 an annular magnet unit coaxially disposed on said cylindrical supporter;
 a magnet detecting device fixed to said wall member to produce, upon rotation of said magnet unit with said rotation shaft, an information signal which represents the rotation speed of said pinion gear; and a coil spring disposed in the blind bore of said cylindrical supporter and compressed between said rotation shaft and said cylindrical supporter so that said cylindrical supporter is biased against said wall member through said single bearing member.

2. A rotary pulse generator as claimed in claim 1, wherein said rotation shaft and said pinion gear are connected so as to permit an axial movement of said rotation shaft relative to said pinion gear.

3. A rotary pulse generator as claimed in claim 1, wherein said single bearing member is a bearing ball and wherein said axial end of said cylindrical supporter is formed with a spherical recess in which said bearing ball is partially received.

4. A rotary pulse generator as claimed in claim 1, in which said one end of said housing is shaped cylindrically and is concentrically received in a cylindrical center bore formed in said pinion gear, so that said pinion gear rotates about the cylindrical end of the housing.

5. A rotary pulse generator as claimed in claim 4 further comprising a stopper ring which is carried by said pinion gear, said stopper ring having a portion which is slidably engaged with an annular groove formed about said housing.

6. A rotary pulse generator as claimed in claim 2, in which said rotation shaft is a square bar which has said first end axially movably received in a square bore formed in a center portion of said pinion gear and said second end axially movably received in a square bore formed in said cylindrical supporter.

7. A rotary pulse generator as claimed in claim 6, in which said cylindrical supporter has a sleeve portion which is pressed inward to contact said second end of the square rotation shaft.

8. A rotary pulse generator as claimed in claim 1, in which said magnet detecting device is a Hall-effect sensor element.

9. A rotary pulse generator as claimed in claim 8, further comprising a print board on which an electronic processing circuit is printed, said print board being connected to said Hall-effect sensor element through wires and stationarily installed in said bore of the housing.

10. A rotary pulse generator as claimed in claim 9, further comprising a socket member connected to said housing, said socket member having connector pins connected through second wires to terminal ends of the electronic processing circuit of said print board.

11. A rotary pulse generator as claimed in claim 1, in which said magnet detecting device is a coil unit which is installed in a molded block, said molded block being tightly fitted in an enlarged end portion of said bore in such a manner that a center axis of said coil unit coincides with the axis of said rotation shaft.

12. A rotary pulse generator as claimed in claim 11, in which said molded block is integrally formed with a socket portion, said socket portion having connector pins which extend from said coil unit.

13. A rotary pulse generator as claimed in claim 12, in which said coil unit comprises:
a coil;
a bobbin on which said coil is wound, said bobbin being formed with two supporting blocks by which said connector pins of said socket portion are held, said coil being connected at both its ends to said connector pins; and
first and second yoke plates which when combined define an annular groove in which said bobbin is concentrically received, said second yoke plate having a cylindrical outer wall which extends forward beyond said first yoke plate.

14. A rotary pulse generator as claimed in claim 1, in which said housing is integrally formed at an axial and thereof with a rectangular socket portion, said socket portion having therein a blind bore which extends in a direction perpendicular to the longitudinal axis of said housing, said socket portion having connector pins which are exposed to said blind bore and connected through a wiring to said magnet detecting device.

15. A rotary pulse generator as claimed in claim 14, in which said socket portion is integrally connected to said housing through a support portion in which said wiring is installed.

16. A rotary pulse generator as claimed in claim 15, in which said support portion is provided with a reinforcing rib.

17. A rotary pulse generator as claimed in claim 12, in which said connector pins are bent at generally right angles before being set in a mold assembly by which said molded block is produced.

* * * * *